(12) United States Patent
Woodhall et al.

(10) Patent No.: US 10,059,847 B2
(45) Date of Patent: Aug. 28, 2018

(54) PROTECTIVE DUST SUPPRESSION COATING SYSTEMS FOR PAINT BOOTHS

(71) Applicant: Cal-West Specialty Coatings, Inc., Sunnyvale, CA (US)

(72) Inventors: Edward William Woodhall, Saratoga, CA (US); Robert Louis Mesa, Santa Clara, CA (US); Brian Ming Wong, Los Altos Hills, CA (US)

(73) Assignee: CAL-WEST SPECIALTY COATINGS, INC., Sunnyvale, CA (US)

( * ) Notice: Subject to any disclaimer, the term of this patent is extended or adjusted under 35 U.S.C. 154(b) by 526 days.

(21) Appl. No.: 13/952,268

(22) Filed: Jul. 26, 2013

(65) Prior Publication Data

US 2014/0158043 A1    Jun. 12, 2014

Related U.S. Application Data

(60) Provisional application No. 61/676,765, filed on Jul. 27, 2012.

(51) Int. Cl.
| | | |
|---|---|---|
| *B65B 33/00* | (2006.01) | |
| *C09D 5/20* | (2006.01) | |
| *B05B 16/40* | (2018.01) | |

(52) U.S. Cl.
CPC .............. *C09D 5/20* (2013.01); *B05B 16/40* (2018.02)

(58) Field of Classification Search
None
See application file for complete search history.

(56) References Cited

U.S. PATENT DOCUMENTS

| | | | |
|---|---|---|---|
| 4,136,050 A | 1/1979 | Brehm | |
| 4,169,170 A | 9/1979 | Doeksen | |
| 4,171,276 A | 10/1979 | Brehm | |
| 4,369,121 A | 1/1983 | Callahan et al. | |
| 4,389,506 A | 6/1983 | Hassall, Jr. | |
| 4,425,252 A | 1/1984 | Cargle et al. | |
| 4,428,984 A | 1/1984 | Shimizu et al. | |
| 4,487,615 A | 12/1984 | Taylor et al. | |
| 4,664,060 A | 5/1987 | Roberts | |
| 5,052,756 A | 10/1991 | Wada et al. | |
| 5,308,647 A | 5/1994 | Lappi | |
| 5,356,334 A | 10/1994 | Gray | |
| 5,409,626 A | 4/1995 | Muth | |
| 5,418,006 A | 5/1995 | Roth et al. | |
| 5,439,608 A | 8/1995 | Kondrats | |
| 5,595,782 A | 1/1997 | Cole | |
| 5,603,992 A | 2/1997 | Woodhall et al. | |
| 5,876,791 A | 3/1999 | Woodhall et al. | |
| 6,117,485 A | 9/2000 | Woodhall et al. | |
| 6,191,097 B1 | 2/2001 | Lueder et al. | |
| 8,066,448 B2 | 11/2011 | Vitale et al. | |
| 8,132,982 B2 | 3/2012 | Vitale et al. | |
| 2002/0017223 A1 | 2/2002 | Summerfield | |
| 2005/0019574 A1 | 1/2005 | Mccrary | |
| 2007/0207269 A1* | 9/2007 | Woodhall | B05D 1/327 427/282 |
| 2007/0246155 A1 | 10/2007 | Janssen et al. | |
| 2009/0090890 A1 | 4/2009 | Nguyen | |
| 2010/0330372 A1* | 12/2010 | Ludtke | B32B 7/06 428/413 |
| 2012/0000361 A1 | 1/2012 | Weatherman et al. | |
| 2012/0090780 A1 | 4/2012 | Stelter et al. | |
| 2014/0087070 A1* | 3/2014 | Liu | C08G 18/0819 427/154 |

* cited by examiner

*Primary Examiner* — Robert T Butcher
(74) *Attorney, Agent, or Firm* — Tom Hunter; Weaver Austin Villeneuve & Sampson LLP

(57) ABSTRACT

In various embodiments multi-component systems for the protection of spray booth surfaces and the suppression of dust are provided. In certain embodiments the multi-component system for the temporary protection of a paint spray booth and the suppression of dust comprises a first component comprising a liquid that when applied to a surface of said paint booth dries to form a peelable film; and a second component comprising a liquid that when applied to a surface of said paint booth or to said film, forms a tacky coating that adheres dust particles. In certain embodiments the system further comprises a third component comprising a liquid that when applied to a surface of said paint booth or to said film, forms a tacky coating that adheres dust particles, wherein the composition of said third component is different than the composition of said second component. In certain embodiments the system further comprises a non-woven material configured for application to a floor of a spray booth.

19 Claims, 2 Drawing Sheets

PROTECTIVE DUST SUPPRESSION COATING SYSTEMS FOR PAINT BOOTHS

CROSS-REFERENCE TO RELATED APPLICATIONS

This application claims priority to and benefit of U.S. Ser. No. 61/676,765, filed on Jul. 27, 2012, which is incorporated herein by reference in its entirety for all purposes.

STATEMENT OF GOVERNMENTAL SUPPORT

[Not Applicable]

BACKGROUND

In many industrial applications and/or collision repair shops, painting (or other overcoating) operations are carried out in facilities often referred to as paint booths or spray booths. A paint booth is a partially or fully enclosed structure typically capable of being heated to high temperatures, and it typically contains interior surfaces made of coated metal or other heat resistant materials. Painting operations are conducted in paint booths in order to contain paint overspray produced during the painting operation as well as to provide a controlled environment for curing paint finishes. During painting operations, paint booth surfaces are often contaminated with paint overspray, making the interior surfaces of the paint booth difficult and time consuming to clean.

The presence of airborne dust and the accumulation of dried paint particles known as "paint dust" can cause defects in freshly painted surfaces by being dislodged from the walls of the paint booth and depositing onto freshly painted surfaces or by being stirred up into the air from which they deposit onto the freshly painted surfaces. After heat curing of the paint finish, the embedded paint dust particles must be removed mechanically by sanding and finishing, adding cost and time to the painting process.

The accumulation of paint overspray on paint booth interior surfaces also diminishes the quality and intensity of ambient light available to the painter. The lack of bright, white interior surfaces causes difficulties for the painter in accurately discerning and matching discerning paint colors, potentially leading to painting mistakes which require costly rework.

Over time, paint overspray builds up on the walls, floor gratings and other structures of the booth. Likewise, paint overspray accumulates on conveyors, racks and other equipment which transports articles through a paint spray facility. It is necessary to periodically remove built up paint overspray. Cleaning the unprotected walls of a paint booth can require some level of restoration and refinishing of the walls, often taking a day or more to accomplish, and resulting in significant booth downtime.

Various materials means have been employed in an attempt to protect paint booth surfaces. A disadvantage of these materials means is that they have generally been difficult and time consuming to apply. These prior art means have also struggled to provide sufficient paint overspray and paint dust capture while adequately enduring the harsh baking environment of the paint booth. Paint booth surface coatings and coverings must endure repeated bake cycles at temperatures up to and in excess of 180° C., yet still be readily removable and replaceable.

Adhesive coated plastic sheets have been employed to cover paint booth surfaces. These plastic sheets are difficult to install and the installation results in many wrinkles which tend to collect and hold paint overspray and other contaminants that in turn are easily dislodged during painting. As previously described, these dislodged particulates can cause paint dust and lead to defects in the paint coating. In addition, the adhesive bond of the plastic sheets to the booth surfaces builds with time and through repeated bake cycles, making the construction difficult or impossible to remove cleanly without slivering of the film or without adhesive residue. Such materials are also prone to puncture, tear, and wrinkling in more demanding environments.

Other masking articles have similarly suffered. For example, masking papers have been employed, and while stiff and somewhat easier to handle than plastic sheets, they lack flexibility and extensibility to easily fit over or around protrusions or obstacles. Paper is also subject to tearing which produces small fibers that can contribute to contamination.

Sprayable polymeric coatings are another material that has been employed to cover paint booth surfaces. However, under repeated baking cycles the solubility of these coatings decrease, complicating the removal process. In addition, washable coatings present environmental concerns if the washings are discarded into common drains or municipal waste water systems.

SUMMARY

In various embodiments a multi-component system for the temporary protection of a paint spray booth and the suppression of dust and/or paint overspray is provided. The system typically comprises a first component comprising a liquid that when applied to a surface of the paint booth dries to form a peelable film; and any one or more components selected from the group consisting of: a second component comprising a liquid that when applied to a surface of the paint booth or to the film, forms a tacky coating that adheres dust particles; a non-woven material configured for application to a floor of a spray booth; and a third component comprising a liquid that when applied to a floor of the paint booth or to the non-woven film, forms a tacky coating that adheres dust particles, and when the second component and the third component are both present in the multi-component system, the second component and the third component have different formulations. In various embodiments the system comprises the first component and the second component. In various embodiments the system comprises the first component and the third component. In certain embodiments the third component, when present, dries to form a tacky coating that is less tacky than the coating formed by the second component.

In various embodiments the first component comprises a liquid film former that when applied to a surface and dried forms a peelable film; and a surfactant. In certain embodiments the film former comprises a film former selected from the group consisting of an acrylonitrile copolymer, an acrylic latex, a poly(carboxylic)acid or a poly(carboxylic) acid copolymer, and a polyvinyl butyral. In certain embodiments the surfactant comprises a surfactant selected from the group consisting of a non-ionic surfactant, a cationic surfactant, an anionic surfactant, and an amphoteric surfactant. In certain embodiments the surfactant comprises a silicon surfactant (e.g. a polysiloxane surfactant) and/or an ethoxylated alcohol surfactant. In certain embodiments the first component further comprises a thickener (e.g., a cellulose, a cellulose derivative, a starch or modified starch, a dextrin, a natural clay, a synthetic clay, a silicone based thickener, an acrylic emulsion thickener, a latex paint associative thickener, a xanthin gum, an acrylic copolymer thickener, and the like). In certain embodiments the thickener comprises a polyether polyol associative thickener. In certain embodiments the thickener comprises a xanthan gum. In certain embodiments the first component further comprises a coalescent. In certain embodiments the coalescent comprises an alcohol ester. In certain embodiments the coalescent comprises trimethylpentanediol monoisobutyrate. In certain embodiments the first component further comprises a biocide. In certain embodiments the film former comprises about 25% to about 90% of the first component before drying; the surfactant comprises up to about 1% of the first component before drying; the thickener, when present, comprises up to about 1% of the first component before drying; the coalescent, when present, comprises up to about 3% of the first component before drying; and the biocide, when present, comprises up to about 0.1% of the first component before drying, wherein the percentage is a percentage weight basis of component ingredients as delivered. In certain embodiments the first component comprises: about 87% film former; about 0.25% surfactant; about 0.3% thickener; about 0.1% coalescent; and about 0.01% biocide, where the percentage is a percentage weight basis of component ingredients as delivered.

In various embodiments the second component comprises a humectant/dust suppressant; and a thickener. In certain embodiments the humectant dust suppressant is selected from the group consisting of polyethylene glycol, and glycerine. In certain embodiments the thickener is selected from the group consisting of a cellulose, a cellulose derivative, a starch or modified starch, a dextrin, a natural clay, a synthetic clay, a silicone based thickener, a latex paint associative thickener, an acrylic emulsion thickener, and an acrylic copolymer thickener. In certain embodiments the thickener is selected from the group consisting of cellulose, hydroxycellulose, methylcellulose, hydroxyethylcellulose, carboxymethylcellulose, and hydroxymethylcellulose. In certain embodiments the thickener comprises carboxymethylcellulose. In certain embodiments the second component further comprises a solution comprising a sugar (e.g., sucrose, glucose, fructose, galactose, lactose, and the like). In certain embodiments the sugar solution comprises corn syrup. In certain embodiments the second component further comprise an alcohol other than ethylene glycol or glycerin. In certain embodiments the alcohol is a monohydric alcohol. In certain embodiments the alcohol is selected from the group consisting of methanol, ethanol, propanol, butyl alcohol, pentanol, and cetyl alcohol. In certain embodiments the alcohol is methanol. In certain embodiments the second component further comprises a surfactant (e.g., a non-ionic surfactant, a cationic surfactant, an anionic surfactant, and an amphoteric surfactant). In certain embodiments the surfactant comprises a non-ionic surfactant. In certain embodiments the surfactant comprises a silicon surfactant (e.g. a polysiloxane surfactant) and/or an ethoxylated alcohol surfactant. In certain embodiments the second component further comprises a pH adjuster (e.g., a base). In certain embodiments the pH adjuster comprises triethanolamine. In certain embodiments the second component further comprises a biocide where the percentage is a percentage weight basis of component ingredients as delivered. In certain embodiments in the second component: the humectant/dust suppressant comprises about 5% to about 50% of the second component before drying; the thickener comprises up to about 5% of the second component before drying; the solution comprising a sugar, when present, comprises up to about 10% of the second component before drying; the alcohol, when present, comprises up to about 5% of the second component before drying; the surfactant, when present, comprises up to about 1% of the second component before drying; the pH adjuster, when present, comprises up to about 5% of the second component before drying; and the biocide, when present, comprises up to about 0.2% of the second component before drying where the percentage is a percentage weight basis of component ingredients as delivered. In certain embodiments the second component comprises: about 22% of the humectant/dust suppressant; about 2.5% of the thickener; about 2% of the sugar solution; about 3% of the alcohol; about 0.2% of the surfactant; about 0.1% of the pH adjuster; and about 0.1% of the biocide where the percentage is a percentage weight basis of component ingredients as delivered.

In various embodiments the third component comprises: a humectant/dust suppressant; and a thickener. In certain embodiments the humectant dust suppressant is selected from the group consisting of polyethylene glycol, glycerine, and an oil. In certain embodiments the thickener is selected from the group consisting of a cellulose, a cellulose derivative, a starch or modified starch, a dextrin, a natural clay, a synthetic clay, a silicone based thickener, a latex paint associative thickener, an acrylic emulsion thickener, and an acrylic copolymer thickener. In certain embodiments the thickener comprises a latex paint associative thickener. In certain embodiments the thickener comprises an acrylate emulsion copolymer. In certain embodiments the third component further comprises a surfactant (e.g., a non-ionic surfactant, a cationic surfactant, an anionic surfactant, and an amphoteric surfactant). In certain embodiments the surfactant comprises a non-ionic surfactant. In certain embodiments the surfactant comprises a silicon surfactant (e.g. a polysiloxane surfactant) and/or ethoxylated alcohol surfactant. In certain embodiments the third component further comprises a pH adjuster (e.g., a base). In certain embodiments the pH adjuster comprises triethanolamine. In certain embodiments the third component further comprises a biocide. In certain embodiments in the third component: the humectant/dust suppressant comprises about 1% to about 20% of the third component before drying; the thickener comprises up to about 25% of the third component before drying; the surfactant, when present, comprises up to about 1% of the third component before drying; the pH adjuster, when present, comprises up to about 1% of the third component before drying; the biocide, when present, comprises up to about 0.05% of the third component before drying where the percentage is a percentage weight basis of component ingredients as delivered. In certain embodiments the third component comprises: about 9% of the humectant/ dust suppressant; about 0.75% of the thickener; about 0.25% of the surfactant; about 0.27% of the pH adjuster; and about 0.05% of the biocide where the percentage is a percentage weight basis of component ingredients as delivered. In certain embodiments the first component, the second component, and the third component when present, are each provided in separate containers.

In certain embodiments the system further comprises a non-woven material configured for application to a floor of a spray booth. In various embodiments the non-woven material is provided as a roll or as a sheet. In certain embodiments the material can be perforated to facilitate separation into various sized sheets. In certain embodiments the non-woven material further comprises an adhesive (or velcro, or other attachment system) to facilitate sticking to a floor. In certain embodiments non-woven material comprises synthetic polymer fibers. In certain embodiments the non-woven material comprises nylon fibers.

In certain embodiments a spray booth is provided where the spray booth is protected using the multi-component systems described herein. In certain embodiments the spray booth comprises one or more walls having dried thereon the first component of the multi-component system as described herein, where the first component is dried to form a peelable film; and one or more of: the second component described herein applied to the peelable film to provide a tacky dust-suppressing coating; and/or a floor having applied thereto the third component of the multi-component system described herein, where the third component forms a tacky dust suppressing coating on the floor. In certain embodiments the spray booth comprises the second component applied to the peelable film to provide a tacky dust-suppressing coating. In certain embodiments the spray booth comprises a floor having applied thereto the third component of the multi-component system of described herein, where the third component forms a tacky dust suppressing coating on the floor. In certain embodiments the spray booth according to any one of claim 67-69, further comprises a floor having applied thereto a non-woven material as described herein. In certain embodiments the spray booth further comprising the third component of the multi-component system of described herein where the third component is applied to the floor and/or to the non-woven material to form component forms a dust suppressing coating on the floor or on the material.

In various embodiments methods of use of the multi-component systems described herein are also provided. In certain embodiments the methods comprise applying to one or more walls of a spray booth the first component of the multi-component system described herein; drying the first component to form a peelable film; and performing one or more of the following: applying to the peelable film the second component of the multi-component system described herein to form a tacky surface on the peelable film; and/or applying to a floor of the booth the third component of the multi-component system described herein, where the third component forms a tacky dust suppressing coating on the floor. In certain embodiments the method comprises applying to the peelable film the second component of the multi-component system described herein to form a tacky surface on the peelable film. In certain embodiments the method comprises applying to a floor of the booth the third component of the multi-component system described herein, where the third component forms a tacky dust suppressing coating on the floor. In certain embodiments the methods further comprise applying to a floor of the booth a non-woven material described herein. In certain embodiments the methods involve applying to the non-woven material the third component of the multi-component system described herein, where the third component forms a tacky dust suppressing coating on the material.

In various embodiments kits are provided that comprise a multi-component system for the temporary protection of a paint spray booth and the suppression of dust and/or paint overspray. In certain embodiments the kits typically comprise: a container containing a first component of the multi-component system described herein; and any one or more of the following: a container containing a second component described herein; a non-woven material configured for application to a floor of a spray booth as described herein, and/or a container containing a third component of a multi-component system described herein.

DETAILED DESCRIPTION

The present disclosure is directed to multi-component systems and methods utilizing such multi-component systems for protecting a substrate and/or for dust suppression. The substrates to be protected may be a vertical surface such as a wall, or a horizontal surface, such as a floor, ceiling, light fixture, or bench top. Certain embodiments of the multi-component systems and methods described herein also function to immobilize surface dust and prevent its becoming airborne and/or to capture airborne dust. Such dust typically comprises dried paint dust, dirt, and other contaminants. The systems and methods thus provide surface protection and dust suppression, while providing a covering that is durable and yet easily removed. In certain embodiments the systems and methods described herein are particularly suited for use in paint spray booths (e.g., automotive paint booths).

In one illustrative embodiment, the multi-component systems contemplated herein comprise a first component (e.g., formulation) that when applied to a surface dries on that surface to form a peelable protective coating. Typically, the multi-component systems contemplated herein comprises one or more of the following: a second component comprising a liquid that when applied to a surface of said paint booth or to said film, forms a tacky coating that adheres dust particles; a non-woven material configured for application to a floor of a spray booth; and/or a third component comprising a liquid that when applied to a floor of said paint booth or to said non-woven film, forms a tacky coating that adheres dust particles, and when said second component and said third component are both present in said multi-component system, said second component and said third component have different formulations.

In various embodiments the second component comprises an aqueous formulation that when applied to a surface forms a tacky and/or "wet" coating that traps dust (airborne particles), insects, lint, and the like that a typical air filtration system cannot adequately control. In certain embodiments the second component is formulated so that it forms a coating that can readily be removed from booth surfaces by the use of running water (e.g., the coating can be removed by simple water wash).

In certain embodiments the second component is applied on top of the cured peelable film formed by application of the first component. By combining the two coatings, one creates a tacky surface on a film that can be removed by peeling and without the use of water. It is believed there are no spray booth protective dust-suppression coatings in the market that are both tacky and peelable like that created by combining the first and second components of the systems described herein.

Figure 1:
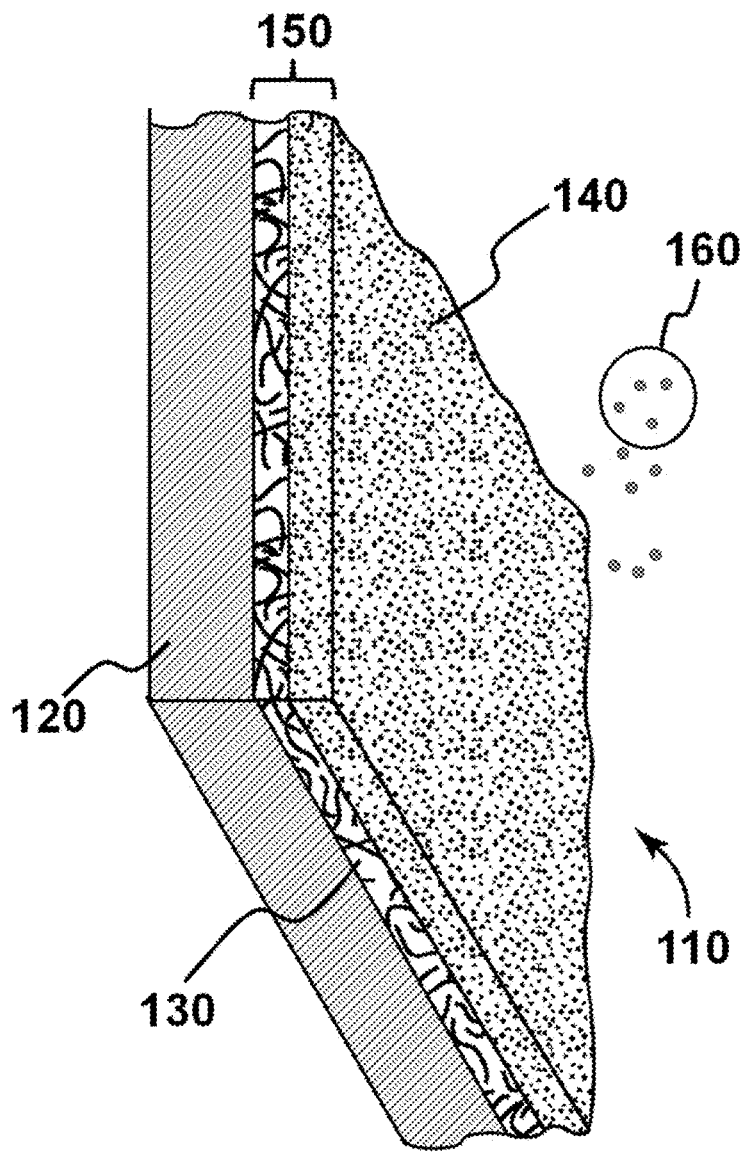
FIG. 1 schematically illustrates the first (peelable) component 130 and the second (dust suppression) component 140 applied to a wall of a spray booth 120.

FIG. 1 schematically illustrates a portion of a surface 110 coated with the first and second components of the multi-component systems described herein. As illustrated, the spray booth surface 120 has applied thereto the first component 130 of the systems described herein which is cured/dried to form a peelable film. The second component 140 is applied to the first component 130 and together the two components form a peelable tacky protective surface 150. After the spray booth is used, the second component 140 can be washed from the first component 130 and then a new layer of the second component 140 can be reapplied to the surface. Alternatively, the peelable coating 130 can simply be peeled off the underlying surface along with the tacky overcoating 140. As indicated above, the tacky second component can act to adhere and thereby reduce airborne dust and/or other airborne particles 160.

In certain embodiments the first and second components are applied to spray booth walls. However it is contemplated that any spray booth surface can be so treated. Thus, in certain embodiments, counters, light fixtures, and/or spray booth floors may also be so coated and protected.

Using the peelable or water strippable dry coatings on walls and ceilings makes these surfaces smooth so contaminants cannot accumulate. These coatings can be clear or colored. In some cases, clear is preferred because they allow the booth walls' standard white color to be seen as well as allowing light to pass through when applied to booth windows and to in-booth lighting fixtures. In other cases a white coating is advantageous on walls when the existing finish of the wall is not good because a white coating can restore the appearance of the wall as though it were newly painted, and thus eliminate the need to repaint the booth.

In certain embodiments the multi-component systems comprise a third component. In various embodiments the third component comprises a coating that can also form a tacky and/or "wet" coating that traps dust (airborne particles), lint, and the like. However, the third component is typically formulated for application to a floor and/or to a non-woven material. In certain embodiments the third component is formulated so that it is less tacky/sticky than the second coating. Application of the third component to a floor attracts and traps airborne particles down on the floor where they can be easily removed from the spray booth (e.g., by sweeping, rinsing with water or scraping) and prevented from contaminating the paintwork. In certain embodiments the third component can, optionally, be used in combination with a fourth a protection sheet, e.g., a non-woven material as described below.

In various embodiments the multi-component systems described herein may further comprise a material (e.g., a non-woven material) configured for application to a floor of a spray booth. Use of a removable floor material to which a particle controlling floor coating (e.g., the third component of the multi-component system) can be applied can further improve the particle reducing performance of the third component and make removal of the contaminants even easier by simply rolling up the dirty floor material (e.g., weekly, biweekly, monthly, etc.) and rolling out a clean one. This floor "scrim" also provides a useful degree of padding so that the painter is more comfortable standing or walking on it.

The floor material typically comprises a non-abrasive, non-woven, nylon (or other material) mesh material of various fiber sizes, types, and amounts. The floor material can be made in sheets or rolls of various widths, lengths and thicknesses (typical thickness would be ¼ inch). In use it is applied to the entire floor of the spray booth. It can be applied over concrete and tile, grated and non-grated floors and painted and non-painted floors. Dirt and paint overspray that falls into the floor material becomes trapped in the material and reduces the amount of airborne contamination in the booth. Its ability to trap contaminants is greatly increased when used with the third component (particle control spray (PCS) described herein). For maximum effectiveness the third component is sprayed onto the floor material daily or more often as required. The third component applied to the material attracts and traps airborne contaminants. When the floor material has been completely saturated with contaminants, it can be easily rolled up and discarded and another sheet or rolls be quickly applied. The floor material also provides a significant amount of cushioning and comfort for painters who typically stand long hours in the paint both.

Figure 2:
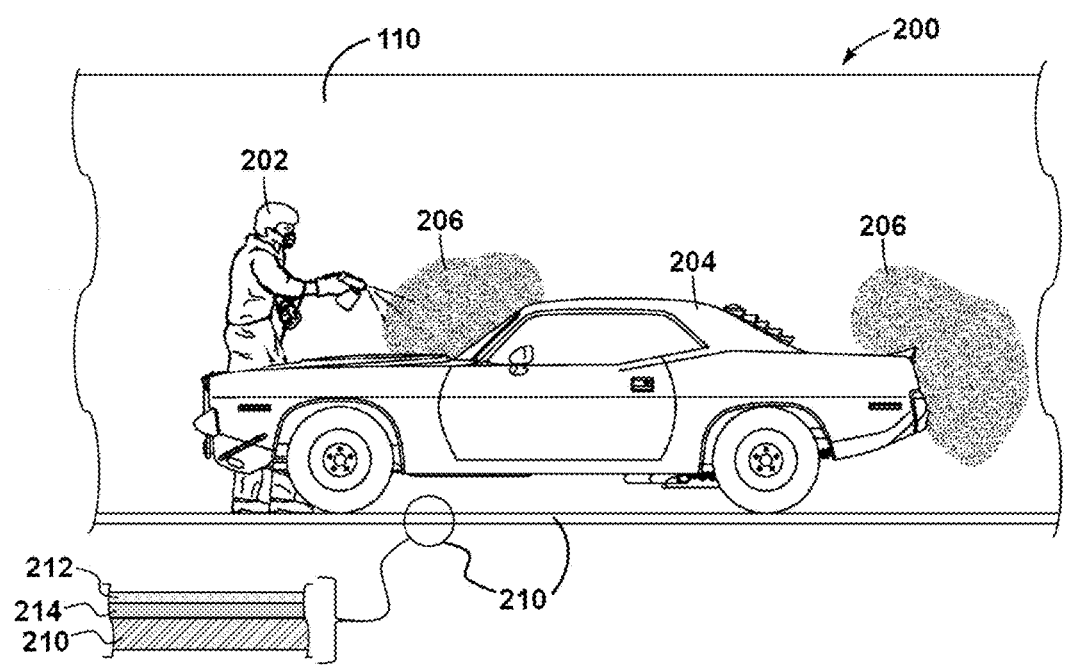
FIG. 2 schematically illustrates a spray booth protected with a multi-component system described herein.

FIG. 2 illustrates the use of one of the systems described herein for the protection of a paint booth 200. An operator 202 is shown painting a car 204 inside the booth 200, wherein the paint overspray 206 is captured within the second component of a coating system described herein that is applied to wall 110. The floor of the paint booth 210 has applied thereto a floor material 214 to which is applied the third component 212 of the multi-component systems described herein. Once the painting operation is complete, the protection system (first, second, and third components) stay in place during bake cycles, as the coatings and the floor material is resistant to thermal shrinkage up to temperatures in excess of 60° C. (180 F). The floor protection material and coating thereon continues to function until saturated with paint and/or particulates, dust and debris, at which point it may be lifted off and replaced.

Using the peelable and/or water strippable coatings on walls and ceilings makes these surfaces smooth so contaminants cannot accumulate. These coatings can be clear or colored. Clear is preferred because they allow the booth walls' standard white color to be seen as well as allowing light to pass through when applied to in-booth lighting fixtures. However, a white coating is advantageous when the existing finish of the wall is not good because the white coating can restore the appearance of the wall as though it were newly painted, and eliminate the need to repaint the booth.

In one illustrative use, the walls, and optionally the floor and/or ceiling, of a spray booth are typically covered with the first component of the multi-component systems described herein that is then cured/dried to form a dry, substantially continuous, peelable film. In certain embodiments the second component is optionally applied to at least the walls (and optionally the floor and/or ceiling, or other surface), of the spray booth. Typically, when used, the second component is applied to a surface (e.g., a wall) covered with the first component thereby providing a tacky, multi-layer, protective film that is also peelable. The first component, second component, and where desired third component, are typically applied using standard methods for the application of water-based coatings. Such methods include, but are not limited to application using brushes, rollers, sprayers, doctor bars, and the like.

The protected booth is then used for various overcoating (e.g., painting) operations during which the coatings function to protect the surface of the booth and to reduce airborne particles and/or dust. As necessary or desired, the second component can be washed off the booth using a water wash and then reapplied. Similarly, as necessary or desired the peelable coating along with materials deposited thereon can be peeled off the surfaces and, optionally, reapplied. Similarly the floor material, optionally coated/impregnated with the third component can be removed and replaced as needed/desired.

The multi-component systems described herein are typically packaged and marketed as spray-booth "kits". A typical kit will comprise a first container containing the first component (peelable film forming composition) and a second container containing the second component (particle/dust suppression formulation). Where desired the third component can also be provided typically in a third container. The kit can optionally comprise sheets or rolls of the floor covering material described herein. In various embodiments the kits also optionally comprise packaging that holds the containers. In various embodiments the kits optionally include instructional materials provided on an insert, instruction book, and/or printed on kit packaging.

The instructional materials typically teach the use of each of the components of the multi-component system described herein to protect spray booths. The instructional materials can also, optionally, provide material safety information regarding the various components of the multi-component system.

While the instructional materials typically comprise written or printed materials they are not limited to such. Any medium capable of storing such instructions and communicating them to an end user is contemplated by this invention. Such media include, but are not limited to electronic storage media (e.g., magnetic discs, tapes, cartridges, chips), optical media (e.g., CD ROM), and the like. Such media may include addresses to internet sites that provide such instructional materials.

The multi-component systems described herein are designed provide a simple, efficient, effective, and environmentally friendly method to (1) protect booth walls, ceiling, windows, floor and lights from paint and solvent overspray, dirt, and other contaminants, (2) to improve and maintain optimal lighting conditions that allow the painter to see better, which in turn, allows for better paint application and color matching between old and new painted surfaces of, e.g., the car, (3) to reduce the amount of airborne particles that can potentially be deposited onto newly applied paint and require rework, and (4) to provide a cushioning floor covering that reduces painter fatigue.

First Component—Peelable Coating.

As indicated above, in various embodiments the multi-component systems described herein comprise a first component (composition) that can be applied to a surface and dried (or otherwise "cured") to form a peelable protective coating on that surface.

While a number of peelable coating compositions can be used for this purpose (see, e.g., U.S. Pat. No. 6,124,044, U.S. Patent Publication No: 2010/0167075 A1, and the like), in certain embodiments, a particularly well suited first component formulation comprises a liquid film former that when applied to a surface and dried forms a peelable film; and a surfactant.

In various embodiments the first component further comprises a thickener, and/or a coalescent, and/or a biocide, e.g., as described below. In certain embodiments the various formulations of the first component can, optionally, omit the surfactant, particularly where the spray booth is fabricated from a material that is easily wet by the coating composition. In certain embodiments the first coating can further comprise a release agent to facilitate easy peeling. The first component formulation is typically an aqueous formulation and thus will typically comprise water in addition to the various agents described herein.

Illustrative formulations of the first component (peelable formulation) are shown in Table 1. These formulations are intended to be illustrative and not limiting. Using the teaching provided herein, numerous other variants on the formulation of the first component (peelable formulation) will be available to one of skill in the art.

TABLE 1

Illustrative first component ("peelable booth coat") formulation(s) (the percentage is a percentage weight basis of component ingredients as delivered).

| Manufacturer | Product | Purpose | Illustrative Alternatives | Illustrative Embodiment | High Range | Low Range |
| --- | --- | --- | --- | --- | --- | --- |
| Solutia | RS 3120 | Film Former | Shark Solutions C1-48 | 87% | 90% | 25% |
| BYK Chemie | BYK 347 | Surfactant | BYK 348 Air products Tomadol 91-6 Rhone Poulenc Rhodasurf TDA 8.5 | 0.25% | 1.% | 0% |
| Arch | Proxel GXL | Biocide | Dow - Kathon LX | 0.01% | 0.1% | 0.005% |
| Eastman | Texanol | Coalescent | | 0.1% | 3.0% | 0.0% |
| CP Kelco | Kelzan AR | Thickener | Elementis Specialties Rheolate 350 | 0.3% | 1.0% | 0.0% |
| | Water | Solvent | | Remainder e.g., 12.34% | | |

It is also noted that while Table 1, illustrates certain alternatives to each of the components listed therein, numerous other commercially available film formers, surfactants, coalescents, biocides, and thickeners are known to those of skill in the art and can be substituted for the listed ingredients. In certain embodiments combinations of various commercial alternatives to each are also contemplated.

Film Formers

Suitable film formers for use in the first component (peelable formulation) of the multi-component systems contemplated herein include, but are not limited to acrylonitrile copolymers, acrylic latex, poly(carboxylic)acids or poly(carboxylic)acid copolymers, polyvinyl butyral, and the like. In certain embodiments the film former comprises a polyvinyl butyral.

The film formers are typically provided as a dispersion or emulsion with aqueous dispersions or emulsions or water-compatible dispersions or emulsions being preferred.

In certain embodiments the butyral film former can comprise a single polyvinyl butyral or a mixture of polyvinyl butyrals. Such polyvinyl butyrals typically have a molecular weight in a range from about 3000 to about 800,000, preferably from about 4,000 to about 700,000, and most preferably from about 5,000 or about 10,000 to about 400,000 or about 500,000. Polyvinyl butyral resin emulsions/dispersions are commercially available from a number of suppliers (e.g., BUTVAR™ aqueous dispersion RPI, aqueous dispersion 261, aqueous dispersion 3120, aqueous dispersion FP, aqueous dispersion BR, from Solutia, Inc., and the like).

In certain embodiments the coating composition can be formulated with other film formers as an alternative, or in combination with the butyral film former. Additional film formers suitable for use in the first component of the multi-component formulations include, but are not limited to vinyl-acrylic copolymers, ethylene vinyl acetates, vinyl chloride copolymers, acrylic latex (e.g., 1324, B.F. Goodrich), acrylic copolymer emulsions (e.g., HYCAR™ 2679, Noveon), styrene acrylic copolymers (e.g., CARBO-SET™ 958, Noveon), polyvinyl acetate emulsions (e.g., VINAC® XX series emulsions from Air Products), and the like.

In various embodiments the film former(s) comprise from about 10% to about 95%. In certain embodiments the film former(s) comprise from about 15%, 20%, or about 25% by weight, up to about 90%, by weight of the first component before drying. In certain embodiments the film former comprises between about 80% and about 90%, or between about 85% or about 90% of the first comment. In certain embodiments the film former comprises about 87% of the first component.

Surfactants

In various embodiments, the protective coating compositions of the present invention optionally include one or more surfactants. Without being bound to a particular theory, the surfactants can improve wetting of the underlying surface when the coating composition is first applied and/or can enhance peelability of dried film. Suitable surfactants include ionic surfactants (cationic or anionic), nonionic surfactants, amphoteric surfactants, and the like.

Examples of nonionic surfactants include various ethoxylated alcohols (alcohol ethoxylates). Such ethoxylated alcohols, include but are not limited to monoethers of polyethylene glycols and long chain alkanols in which the alkanol has 10 to 16 carbon atoms and the polyethylene glycol has 5 to 15 oxyethylene units. Such monoethers of polyethylene glycol are generally made by reacting the alkanol with ethylene oxide. Such nonionic surfactants are well known to those of skill in the art and are commercially available. For example, commercially available TOMADOL® 25-7, a nonionic surfactant, is an adduct of 7 mols of ethylene oxide and 1 mol of a mixture of alkanols of 12 to 15 carbon atoms. Other related nonionic surfactants include TOMADOL® 25-3, NEODOL® 4511, NEODOL®2503, ALFONIC® 1618-65, PLURAFAC® B26, and the like. in certain embodiments the alcohol ethoxylate comprises RHODA-SURF® TDA-8.5 available from Rhodia in Cranbury, N.J. (USA).

Ionic surfactants include anionic and cationic surfactants. Suitable anionic surfactants are well known to those of skill in the art and include, but are not limited to various carboxylates, N-acylsarcosinates, acylated protein hydrolysates including various sulfonates, ethoxylated and/or sulfonated alkylphenols, and the like. Cationic surfactants are also well known to those of skill in the art and include, but are not limited to aliphatic mono-, di- and polyamines derived from fatty and rosin acids, quaternary ammonium salts, and the like.

Suitable amphoteric surfactants include, but are not limited to, the alkylbetaines, alkyldimethylamines, amphoteric imidazolinium derivatives, and the like.

In certain embodiments, the surfactant includes two nonionic surfactants, one a low hydrophile-lipophile balance (HLB) surfactant and the other a high (HLB) surfactant. The hydrophile-lipophile balance is an expression of the relative simultaneous attraction of surfactant for water and for oil, or for the two phases of the emulsion system being considered. The high HLB surfactant then acts as an emulsifier effectively solubilizing the HLB surfactant. In a certain embodiments, nonionic low HLB and high HLB surfactants are combined with a high foaming ionic surfactant which provides foam height and helps lift abraded particles, dirt and oil up away from the underlying surface.

As used herein, a low HLB surfactant is one which has an HLB number ranging from about 3 to about 8, while a high HLB surfactant is one which has an HLB number ranging from about 9 to about 2.

In certain embodiments, the surfactant comprises TOMADOL® 25-3 (Tomah, Inc.) as the low HLB surfactant (HLB number about 7.8) and TOMADOL® 25-7 (Tomah, Inc.) as the high HLB surfactant (HLB number about 12.3) and RHODAPLEX® CO 436, sodium dodecyl sulfate, dioctylsodiumsulfosuccinate (e.g., ACROSOL® OT-75), STEOL® CA-460, or STEOL® CS-460 as the high foaming surfactant. Other suitable high HLB, low HLB and high foaming surfactants will be known to those of skill in the art.

Also suitable is TRITON® X-100 ($C_{14}H_{22}O(C_2H_4O)_n$ where the average number of ethylene oxide units per molecule is around 9 or 10) and surfactants having fluorinated alkyl chains such as "FLUORAD®" products sold by Minnesota Mining and Manufacturing (St. Paul, Minn., U.S.A.) and "ZONYL®" products sold by DuPont Company (Wilmington, Del., U.S.A.) are also suitable. In addition, many embodiments can include polyethoxy adducts or modified (poly)ethoxylates such as TRITON® DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as MACOL® 18 and 19 made by Mazer Chemicals), acetylenic diol-based surfactants (such as SURFYNOL® 104 made by Air Products), and the like.

In various embodiments the surfactant(s) comprise one or more silicone (siloxane-based) surfactants. Such surfactants include, but are not limited to silicone polyoxyalkylene copolymers, organosilicone-polyether copolymer surfactants, and the like. Such surfactants include, but are not limited to various dimethicone surfactants such as PEG-11 methyl ether dimethicone (e.g., GRANSURF® 71), PEG-10 dimethicone (e.g., GRANSURF® 77), stearoxymethicone/dimethicone copolymer (e.g., GRANSIL® ST-9), and the like. In certain embodiments, preferred siloxane-based surfactants include BYK® surfactants (e.g., BYK-345, BYK346, BYK-347, BYK-348, and the like) available from BYK Chemie GmbH (West Germany). Other silicone surfactants can be identified for example in Hill (1999) *Silicon Surfactants*, Marcel Decker, New York.

In certain embodiments, the surfactant comprises a linear fatty alcohol ether sulfate (e.g., $CH_3(CH_2)_{10}CH_2(OCH_2CH_2)_3OSO_3NH_4$ available as STEOL® CA-460 from Stepan).

In various embodiments, the total surfactant comprises up to about 1% of the first component of the multi-component system described herein. In certain embodiments the surfactant, when present comprises between about 0.01% to about 0.5%, or about 0.1% to about 3% of the first component before drying. In certain embodiments the surfactant is present at about 0.25% of the first component.

Thickeners

In various embodiments, the first component (peelable film coating) of the multi-component systems described herein optionally includes one or more thickeners.

Essentially any thickener, preferably water soluble or water-compatible thickeners can be utilized in the first component. Certain preferred thickeners show little or no water sensitivity.

Thickening agents are well known to those of skill in the art and include, but are not limited to, natural product thickeners such as cellulose, cellulose derivatives (e.g., hydroxycellulose, methylcellulose, hydroxyethylcellulose, hydroxymethylcellulose, etc.), starch or modified starches, dextrins, xanthan gums, and the like.

Suitable commercial thickeners well known to those of skill in the art include, but are not limited to, Montmorillonite, EZ-1, BFG, Acrysol™ (e.g. ACRYSOL® RM 825, ACRYSOL® RM-W8, ACRYSOL® RM-W12, and the like), RHEOLATE® (e.g., RHEOLATE® 450, Rheox Co.), OPTIFLO® (e.g., OPTIFLO® TVS, OPTIFLO® H600, from Sud-Chemie), and the like. Certain desirable thickeners include, but are not limited to various polymer or polymer emulsion thickeners such as silicone based thickeners, acrylic emulsion thickeners (e.g., CARBOPOL® EP1, CARBOPOL®1324, etc.) and acrylic copolymers (e.g., CARBOPOL® EZ-1, CARBOPOL® EZ-3), polyether polyol-based associative thickener (e.g., RHEOLATE® 350), and the like.

In certain embodiments thickener, when present in the first component, comprises a xanthan gum (e.g. KELZAN® AR) and/or a polyether polyol-based associative thickener (e.g., RHEOLATE® 350).

In various embodiments the thickener can be present at up to about 4% or up to about 3%, or up to about 2%, or up to about 1%, by weight of the first component, but it is typically present at up to about 0.8%, or up to about 0.5%, or up to about 0.3%. In certain embodiments when the thickener is present it comprises at least about 0.1% of the first component and can range up to about 1% or up to about 0.5% of the first component of the multi-component formulation. In certain embodiments the thickener is present at about 0.3% of the first component of the multi-component formulation, particularly where the thickener is a Kelzan thickener in a Butvar film. Where a thickener such as Rheolate 350 is used a typical level ranges from about 2% to about 4% or about 5%, more preferably about 3.0%.

Coalescents

In certain embodiments the first component of the multi-component formulation comprise a coalescent. Coalescents are used in water-based film forming compositions to improve film formation (e.g., hardness) by temporarily lowering the glass transition temperature (Tg) of the polymers comprising the film former. Coalescents thus act as a temporary plasticizer "softening" the polymer which can then flow facilitating the fusing of polymer chains with each other to create a protective film. Typically the coalescent decreases the open time, while giving better hardness to the film. In various embodiments the coalescents utilized in the first component of the multi-component formulations described herein comprise coalescents suitable for use in latex paints.

Coalescents are well known to those of skill in the art and include, for example 2,2,4-trimethyl-1,3-pentanediol monoisobutyrate (TMB), 2-ethylhexyl benzoate (VELATE® 368), fatty acid esters (e.g., ester alcohol reactive coalescents such as ARCHER RC®, and the like), ester alcohols such as TEXANOL®, and the like.

In various embodiments the coalescent when present ranges up to about 3%, by weight of the first component of the multi-component formulations. In certain embodiments, when present the coalescent comprises about 0.01% to about 3%, or about 0.05% to about 2%, or about 0.05% to about 0.5% of the first component of the multi-component formulations described herein. In certain embodiments, the coalescent comprises about 0.3% of the first component formulation.

Biocides

In certain embodiments, first component (peelable coating) formulation includes a biocide or preservative to improve shelf life and to help prevent degradation of the wet composition and/or the protective film formed therefrom. Compatible biocides are well known to those of skill in the art. Illustrative biocides include, for example, PROXEL GXL® (an aqueous solution of 1,2-benzisothiazolin-3-one), and KATHON LX® a combination of 5-chloro-2-methyl-4-isothiazolin-3-one and 2-methyl-4-isothiazolin-3-one (total active ingredient ~14%), and the like.

In certain embodiments biocide concentrations, when present, are less than about 5%, preferably less than about 3%, more preferably less than about 1%, of the peelable component formulation. In certain embodiments the biocide comprises about 0.005% up to about 0.1%, or about 0.005% up to about 0.0.05% of the peelable component formulation. In certain embodiments the biocide comprises about 0.1% of the peelable component formulation.

Other Ingredients.

In certain embodiments the first component (peelable coating formulation) optionally comprise a release agent and/or a pigment. Release agents can be included to facilitate peeling of the coating from certain surfaces. Suitable releasing agents include, but are not limited to, natural and synthetic waxes, wax emulsions (e.g., #110 available from Michelman, Cincinnati, Ohio, USA), lecithin, various silicone surfactants, and surfactants with a hydrophile-lipophile balance (HLB) ranging, e.g., from about 8 to about 10.

In certain embodiments the first component (peelable coating formulation) optionally comprise a pigment to provide coloration. However, without being bound to a particular theory, it is believed that the pigment may also contribute to long term chemical stability of the composition through ultraviolet-blocking. In addition, the pigment can contribute to mechanical strength and stability of the composition (when dried as a film) by acting as a filler. Finally, it is believed that the pigment can help to decrease the water sensitivity of the composition.

In various embodiments the pigment is a finely divided material that contributes to optical and other properties of the coating. The pigment is typically insoluble in the coating medium (e.g., the aqueous dispersion) and is typically mechanically mixed with the coating and deposited when the coating dries. The physical properties of the pigment are typically not changed by incorporation in and deposition from the coating. Preferred pigments include, but are not limited to, inorganic "white" pigments although colored and certain organic pigments are also suitable. Inorganic white pigments suitable for this invention include, but are not limited to, titanium dioxide, white lead, zinc oxide, lithopone (a mixture of zinc sulfide and barium sulfate), zinc sulfide and antimony oxide. Titanium dioxide (e.g., TI-PURE® R-902, DuPont Chemicals, Wilmington, Del., USA) is particularly suitable for use in the first component because of its high efficiency (unit opacity/weight). The pigment may be present at about 1% to about 20%, more preferably about 1% or 2% to about 8% or 10% and most preferably about 4% to about 6% (e.g., about 4.5%) by weight, of the first component.

The formulations of the first component (peelable component) of the multi-component systems described herein are intended to be illustrative. Using the teachings provided herein, numerous other suitable peelable formulations will be available to one of skill in the art.

Second Component—Dust/Particle Suppressant/Adherent Coating.

As indicated above, in various embodiments the multi-component systems described herein further comprise a second component (composition) that can be applied to a surface (preferably a surface coated with a peelable film (e.g., one formed by application of the first component of the system)), where the second component forms a tacky, in certain embodiments a "wet" lay that serves to immobilize particular matter that would otherwise become airborne and/or that reduces airborne particulate matter. The second component thus acts as a dust suppressant.

The second component is formulated so that it can easily be washed off of the peelable coating. In combination with the peelable coating the second component forms a peelable multi-layer dust-suppressant film.

The second component is typically formulated so that, when applied to a vertical or inverted surface, the layer formed thereby adheres and does not substantially flow. Basically, unless removed, the layer formed by the second component stays substantially in place.

Typically the second component comprises an agent that provides wetness and/or stickiness. Suitable agents include, for example, various humectants (e.g., glycerine, propylene glycol, etc.). In various embodiments the second component further comprise one or more of a thickener, a sugar (solution), a surfactant, an alcohol, a pH adjuster, and a biocide. The second component formulation is typically an aqueous formulation and thus will typically comprise water in addition to the various agents described herein.

Illustrative formulations of the second component (dust suppression formulation) are shown in Table 2. These formulations are intended to be illustrative and not limiting. Using the teaching provided herein, numerous other variants on the formulation of the first component will be available to one of skill in the art.

TABLE 2

Illustrative second component ("sticky booth") formulation(s) (the percentage is a percentage weight basis of component ingredients as delivered).

| Manufacturer | Product | Purpose | Alternative | Illustrative Embodiment | High Range | Low Range |
|---|---|---|---|---|---|---|
| | Glycerine | Humectant Dust suppressant | Polyethylene glycol | 22.0% | 50.0% | 5.0% |
| CP Kelco | Cekol 150 carboxymethyl-cellulose | Thickener | CP Kelco Kelzan | 2.5% | 5.0% | 0.0% |
| Archer Daniels Midland | Corn Syrup | Humectant Tackyness | Sugar solutions Honey molasses | 2.0% | 10.0% | 0.0% |
| | Alcohol (e.g., Methyl Alcohol) | Solvent | Various monohydric alcohols | 3.0% | 5.0% | 0.0% |
| Air Products | Tomadol 91-6 | Surfactant | Other surfactants | 0.2% | 1.0% | 0.01% |
| Dow | Kathon LX | Biocide | Other biocides Arch - Proxell GXL | 0.1% | 0.2% | 0.01% |
| | Triethanolamine Water | pH Adjuster Solvent | Other bases | 2.0% Remainder e.g., 68.2% | 5.0% | 0.0% |

As indicated above, in certain embodiments, the second component comprise an agent that acts as a humectant to provide wetness and/or tackiness to facilitate dust suppression. Suitable agents include, but are not limited to glycol ethers (e.g., polyethylene glycol, polypropylene glycol, etc.), glycerine, various oils (e.g., mineral oil vegetable oil, synthetic oils, etc.), and the like. Typically the humectant comprise from about 2%, 3%, 4%, or 5% of the second component formulation up to about 50%, or up to about 40%, or up to about 30% of the second component formulation. In certain embodiments the humectant comprise between about 15% or 20% and about 30% of the second component formulation, and in some embodiments, the humectant comprises about 22% of the second component formulation.

In various embodiments the second component additionally comprises a thickener. Suitable thickeners include, but are not limited to any of the natural product and/or commercial synthetic thickeners described above. In certain embodiments the thickener comprises a thickener selected from the group consisting of a cellulose, a cellulose derivative, a starch or modified starch, a dextrin, a natural clay, a synthetic clay, a silicone based thickener, a latex paint associative thickener, an acrylic emulsion thickener, and an acrylic copolymer thickener. In certain embodiments the thickener is selected from the group consisting of cellulose, hydroxycellulose, methylcellulose, hydroxyethylcellulose, carboxymethylcellulose, and hydroxymethylcellulose, and in certain embodiments, the thickener comprises carboxymethylcellulose. In certain embodiments the thickener, when present ranges up to about 5% of the second component formulation. In certain embodiments the thickener ranges from about 0.1%, or about 0.5%, or about 1% up to about 5%, or up to about 4%, or up to about 3% the second component formulation. In certain embodiments the thicker comprises about 2.5% of the second component formulation.

In various embodiments the second component includes a solution comprising a sugar to further act as a humectant and to provide additional adhesion/tackiness. In certain embodiments the sugar in the solution comprises sucrose, glucose, fructose, galactose, and/or lactose. In certain embodiments the solution comprises corn syrup (fructose solution). The sugar solution, when present comprises up to about 10% of the second component formulation. In certain embodiments the sugar solution ranges from about 0.1, or about 0.5%, or about 1% up to about 10%, or up to about 8%, or up to about 6%, or up to about 5%, or up to about 4% of the second component formulation. In certain embodiments the sugar solution comprises about 2% of the second component formulation.

In various embodiments the second component comprises an alcohol to act as a solvent. In certain embodiments the alcohol is an alcohol other than ethylene glycol or glycerin. In certain embodiments the alcohol is comprises a monohydric alcohol and in certain embodiments, the alcohol is selected from the group consisting of methanol, ethanol, propanol, butyl alcohol, pentanol, and cetyl alcohol. In certain embodiments the alcohol is methanol. In various embodiments the alcohol, when present ranges up to about 5% of the second component formulation. In certain embodiments the alcohol comprises from about 0.5%, from about 1%, from about 2%, up to about 5%, or up to about 4% of the second component formulation. In certain embodiments the alcohol comprises about 3% of the second component formulation.

In various embodiments the second component formulation comprises a surfactant. Suitable surfactants include, but are not limited to the surfactants described above. In certain embodiments the surfactant comprises a non-ionic surfactant, a cationic surfactant, an anionic surfactant, and/or an amphoteric surfactant. In certain embodiments the surfactant comprises a non-ionic surfactant. In certain embodiments the surfactant comprises a silicon surfactant (e.g. a polysiloxane surfactant). In certain embodiments the surfactant comprises an ethoxylated alcohol surfactant (e.g., TOMADOL 91-6®). In certain embodiments the surfactant comprises an ionic surfactant (e.g., a cationic surfactant). Cationic surfactants carry a positive charge when dissolved in aqueous media. Since dust generally carries an appreciable electrostatic charge due to friction with the air, the positive charge of the ionic surfactant can aid in the collection and suppression of the dust particles. The surfactant is typically present in an "effective amount", e.g., an amount sufficient to facilitate the second component to effectively wet the surface to which it is applied (e.g., to wet the peelable film produced by the first component). In certain embodiments the surfactant, when present in the second component formulation, ranges up to about 1% of the second component formulation. In certain embodiments the surfactant comprises about 0.01% or about 0.1% up to about 1%, or up to about 0.8%, or up to about 0.5%, or up to about 0.3% of the second component formulation. In certain embodiments the surfactant comprises about 0.2% of the second component formulation.

The second component formulation can additionally comprise a biocide. Suitable biocides include, but are n of the second component formulation to limited to KATHON LX® or PROXELL GXL®, e.g., as described above. In various embodiments, when present the biocide ranges up to about 0.2% of the second component formulation. In certain embodiments the biocide comprises 0.01% to about 0.2% of the second component formulation. In certain embodiments the biocide comprises about 0.1% of the second component formulation.

In certain embodiments the second component formulation comprises a "neutralizer" or a "pH adjuster" to adjust the pH of the composition. Typically the pH will be adjusted to about pH 8.0 to about pH 9.0. Means of adjusting pH are well known to those of skill in the art. Particularly where a polymer emulsion is present it is desirable to add a base to neutralize the emulsion. This may be accomplished by the addition of one of a number of water soluble bases well known to those of skill in the art. These include, but are not limited to sodium hydroxide, sodium bicarbonate, calcium carbonate, and amine bases such as pyridine and ethylamine and ammonia. In certain preferred embodiments, the neutralizer comprises triethanolamine.

The formulations of the second (particle/dust-suppression component) of the multi-component systems described herein are intended to be illustrative and not limiting. Using the teachings provided herein, numerous other particle/dust suppressant formulations will be available to one of skill in the art.

Third Component—Dust/Particle Suppressant/Adherent Coating for Floors.

As indicated above, in various embodiments the multi-component systems described herein optionally comprise a third component that also acts as a dust/particle suppressant and that is formulated for application to a floor or floor covering. In certain embodiments the third component is not as sticky/wet/tacky as the second component.

Like the second component, the third component is typically formulated so that it can easily be washed off of a surface using water.

Typically the third component also comprises an agent that provides wetness and/or stickiness. Suitable agents include, for example, various humectants (e.g., glycerine, propylene glycol, etc.). In various embodiments the second component further comprises one or more of a thickener, a surfactant, a pH adjuster, and a biocide. The third component formulation is typically an aqueous formulation and thus will typically comprise water in addition to the various agents described herein.

Illustrative formulations of the third component (dust suppression formulation for floors) are shown in Table 3. These formulations are intended to be illustrative and not limiting. Using the teaching provided herein, numerous other variants on the formulation of the first component will be available to one of skill in the art.

TABLE 3

Illustrative third component ("OF-5") formulation(s) (the percentage is a percentage weight basis of component ingredients as delivered).

| Manufacturer | Product | Purpose | Alternative | Illustrative Embodiment | High Range | Low Range |
|---|---|---|---|---|---|---|
| | Polyethylene glycol | Humectant Dust suppressant | Glycerine | 9.0% | 20.0% | 1.0% |
| Dow Chemical | Acrysol TT - 615 | Thickener | Lubrizol EP-1 | 0.75% | 2.0% | 0.% |
| Air Products | Tomadol 91-6 | Surfactant | Other surfactants | 0.25% | 1.0% | 0.0% |
| Dow | Kathon LX | Biocide | Other biocides Arch - Proxell GXL | 0.01% | 0.05% | 0.005% |
| | Triethanolamine | pH Adjuster | Other bases | 0.27% | 1.0% | 0.0% |
| | Water | Solvent | | Remainder e.g., 89.7% | | |

As indicated above, in certain embodiments, the third component comprised an agent that acts as a humectant to provide wetness and/or tackiness to facilitate dust suppression. Suitable agents include, but are not limited to glycol ethers (e.g., polyethylene glycol, polypropylene glycol, etc.), glycerine, various oils (e.g., mineral oil vegetable oil, synthetic oils, etc.), and the like. In certain embodiments polyethylene glycol and/or glycerine are particularly preferred. Typically the humectant comprise from about 2%, 3%, 4%, or 5% of the third component formulation up to about 20%, or up to about 15%, or up to about 10% of the third component formulation. In certain embodiments the humectant comprise between about 5% and about 10% of the third component formulation, and in some embodiments, the humectant comprises about 9% of the third component formulation.

In various embodiments the third component additionally comprises a thickener. Suitable thickeners include, but are not limited to any of the natural product and/or commercial synthetic thickeners described above. In certain embodiments the thickener comprises a thickener selected from the group consisting of a cellulose, a cellulose derivative, a starch or modified starch, a dextrin, a natural clay, a synthetic clay, a silicone based thickener, a latex paint associative thickener, an acrylic emulsion thickener, and an acrylic copolymer thickener. In certain embodiments the thickener comprises an acrylic polymer emulsion (e.g., a hydrophobically modified anionic thickener such as ACRYSOL TT-615®, and the like) and/or an acrylate emulsion copolymer. (e.g., LUBRIZOL (CARBOPOL) EP-1®, and the like). In certain embodiments the thickener, when present ranges up to about 2% of the third component formulation. In certain embodiments the thickener ranges from about 0.1%, or about 0.5%, or about 2% up to about 2%, or up to about 1%. In certain embodiments the thicker comprises about 0.75% of the third component formulation.

In various embodiments the third component formulation comprises a surfactant. Suitable surfactants include, but are not limited to the surfactants described above. In certain embodiments the surfactant comprises a non-ionic surfactant, a cationic surfactant, an anionic surfactant, and/or an amphoteric surfactant. In certain embodiments the surfactant comprises a non-ionic surfactant. In certain embodiments the surfactant comprises a silicon surfactant (e.g. a polysiloxane surfactant). In certain embodiments the surfactant comprises an ethoxylated alcohol surfactant (e.g., TOMADOL 91-6®). The surfactant is typically present in an "effective amount", e.g., an amount sufficient to facilitate the third component to effectively wet the surface to which it is applied (e.g., to wet the peelable film produced by the first component). In certain embodiments the surfactant, when present in the third component formulation, ranges up to about 1% of the third component formulation. In certain embodiments the surfactant comprises about 0.01% or about 0.1% up to about 1%, or up to about 0.8%, or up to about 0.5%, or up to about 0.3% of the third component formulation. In certain embodiments the surfactant comprises about 0.25% of the third component formulation.

The third component formulation can additionally comprise a biocide. Suitable biocides include, but are n of the third component formulation to limited to KATHON LX® or PROXELL GXL®, e.g., as described above. In various embodiments, when present the biocide ranges up to about 0.2% of the third component formulation. In certain embodiments the biocide comprises 0.005% up to about 0.052% of the third component formulation. In certain embodiments the biocide comprises about 0.01% of the third component formulation.

In certain embodiments the third component formulation comprises a "neutralizer" or a "pH adjuster" to adjust the pH of the composition. Typically the pH will be adjusted to about pH 8.0 to about pH 9.0. Means of adjusting pH are well known to those of skill in the art. Particularly where a polymer emulsion is present it is desirable to add a base to neutralize the emulsion. This may be accomplished by the addition of one of a number of water soluble bases well known to those of skill in the art. These include, but are not limited to sodium hydroxide, sodium bicarbonate, calcium carbonate, and amine bases such as pyridine and ethylamine and ammonia. In certain preferred embodiments, the neutralizer comprises triethanolamine.

The formulations of the third (particle/dust-suppression component) of the multi-component systems described herein are intended to be illustrative and not limiting. Using the teachings provided herein, numerous other particle/dust suppressant formulations will be available to one of skill in the art.

Floor Material ("Scrim").

In various embodiments the multi-component systems described herein may further comprise a material (e.g., a non-woven material) configured for application to a floor of a spray booth. Use of a removable floor material to which a particle controlling floor coating (e.g., the third component of the multi-component system) can be applied can further improve the particle reducing performance of the third component make removal of the contaminants even easier by simply rolling up the dirty floor material (e.g., weekly, biweekly, monthly, etc.) and rolling out a clean one. This floor "scrim" also provides a useful degree of padding so that the painter is more comfortable standing or walking on in the spray booth and experiences less fatigue over time.

The floor material typically comprises a non-abrasive, non-woven, material. Typically such materials are fabricated out of synthetic materials (e.g., nylon mesh material of various fiber sizes), often held together by use of a bonding resin. Other materials may be used such as non-woven polypropylene, polyethylene, and the like. The floor materials can be made in sheets or rolls of various widths, lengths and thicknesses. In certain embodiments a typical thickness would be about ¼ inch. However in various embodiments, thickness may vary from 1/16 inch or about ⅛ inch up to about 1 inch, or up to about ¾ inch, or up to about ½ inch, or up to about ⅜ inch.

In various embodiments the non-woven material is provided with a fiber density/mesh size that permits easy coating, and optional impregnation, with the third component of the multi-component systems described herein to form a wet or tacky dust suppression flooring material.

Any number of materials that are generally known in the art are suitable for making the nonwoven portion materials contemplated for use in the systems described herein. The nonwoven material can be chosen to optimize: fiber surface area, inter-fiber bonding to prevent "linting" or release of fibers which could also cause defects, fiber chemical composition, color, denier, or fiber basis weight.

By way of background, a nonwoven sheet derives its strength from chemical bonding or physical bonding (e.g. mechanical bonding) of its composite fibers. In the former process, the fibers may be coated with an adhesive resin that is cured or solidified to "resin-bond" the web. In the latter process, the fibers may be melt blown together in which blown fibers may bond together by mutual melting at a sufficient temperature.

Mechanical bonding entangles fibers to confer strength to the web, commonly by needle punching or spun lacing. In the latter method, jets of high-pressure water are directed at an incoming dry-laid web of non-bonded fibers. The jet action serves to highly entangle the web's fibers and yields a nonwoven of high strength. This process is described in U.S. patent Nos.: U.S. Pat. No. 3,403,862 and U.S. Pat. No. 3,485,706. Spun laced fibers have the advantage of soft handle and conformability, sometimes referred to as drapability.

In one illustrative embodiment the nonwoven material comprises spun laced fibers selected from the group comprising polyester fibers, rayon fibers, nylon fibers, polyolefin fibers (e.g. polypropylene and blend fibers), cotton fibers, and equivalents and blends thereof.

Nonwoven materials are typically described in terms of material basis weight, that is, the weight of a defined unit area of material. Some embodiments contemplated herein comprise nonwoven materials with material basis weights ranging from about ten grams/meter$^2$ up to about eighty grams/meter$^2$, other embodiments from about twenty grams/meter$^2$ to about sixty-five grams/meter$^2$ and in yet further embodiments from about twenty-five grams/meter$^2$ to about forty-five grams/meter$^2$. As one of ordinary skill in the art will appreciate, the material sheets should be constructed with materials providing strength such that the sheet can withstand removal forces after being coated with the third component of the multi-component systems described herein after repeated bake cycles and vehicle or foot traffic.

In addition one of ordinary skill in the art will appreciate that the material sheet can be constructed of any material, such as woven or nonwoven fibers or fabrics, alone or in combination, so long as the minimal mechanical and application properties are met.

While not wishing to be bound by theory, it is thought that protection sheets constructed from nonwoven materials act much like a static filter, taking advantage of the predominant airflow supply direction in the typical paint booth. When combined with the third dust/particle suppressant coating described herein, the material can act as an active filter and further act to prevent materials on the floor from being kicked up due for example to foot traffic.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A multi-component system for the temporary protection of a paint spray booth and the suppression of dust and/or paint overspray, said system comprising:
    a first component comprising a liquid that when applied to a surface of said paint booth dries to form a peelable film; and
    a second component, wherein said second component comprises an aqueous liquid that when applied to a surface of said paint booth or to said peelable film, forms an adherent coating that, in use, is not fully dry and that adheres and traps dust particles; or
    a second component, wherein said second component comprises, a non-woven material configured for application to a floor of a spray booth; and
    optionally a third component comprising an aqueous liquid that when applied to a floor of said paint booth, or to said non-woven material, forms an adherent coating that, in use, is not fully dry and that adheres and traps dust particles, and when said second component and said third component are both present in said multi-component system, said second component and said third component have different formulations.

2. The multi-component system of claim 1, wherein said system comprises said first component, said second component, and said third component.

3. The multi-component system of claim 2, wherein:
    said second component comprises an aqueous liquid that when applied to a surface of said paint booth or to said peelable film, forms an adherent coating that, in use, is not fully dry and that adheres and traps dust particles; and
    said third component forms a coating that is less adherent to dust particles than the coating formed by said second component.

4. The multi-component system of claim 1, wherein said first component comprises:
    a liquid film former that when applied to a surface and dried forms a peelable film; and
    a surfactant.

5. The multi-component system of claim 4, wherein said liquid film former comprises a film former selected from the group consisting of an acrylonitrile copolymer, an acrylic latex, a poly(carboxylic)acid or a poly(carboxylic) acid copolymer, and a polyvinyl butyral.

6. The multi-component system of claim 4, wherein said liquid film former comprises a polyvinyl butyral.

7. The multi-component system of claim 4, wherein said first component further comprises a thickener.

8. The multi-component system of claim 7, wherein:
said liquid film former comprises about 25 weight % to about 90 weight % of said first component before drying;
said surfactant comprises up to about 1 weight % of said first component before drying;
said thickener comprises up to about 1 weight % of said first component before drying;
said first component comprises a coalescent, wherein said coalescent comprises up to about 3 weight % of said first component before drying; and
said first component comprises a biocide, wherein said biocide comprises up to about 0.1 weight % of said first component before drying.

9. The multi-component system of claim 8, wherein said first component comprises:
about 87 weight % liquid film former;
about 0.25 weight % surfactant;
about 0.3 weight % thickener;
about 0.1 weight % coalescent; and
about 0.01 weight % biocide.

10. The multi-component system of claim 1, wherein said second component comprises:
a humectant; and
a thickener.

11. The multi-component system of claim 10, wherein said second component further comprises a solution comprising a sugar.

12. The multi-component system of claim 11, wherein said second component further comprises an alcohol other than ethylene glycol or glycerin.

13. The multi-component system of claim 12, wherein said second component further comprises a surfactant.

14. The multi-component system of claim 12, wherein in said second component:
said humectant comprises about 5 weight % to about 50 weight % of said second component;
said thickener comprises up to about 5 weight % of said second component;
said solution comprising a sugar, when present, comprises up to about 10 weight % of said second component;
said alcohol, when present, comprises up to about 5 weight % of said second component;
said surfactant, when present, comprises up to about 1 weight % of said second component;
said pH adjuster, when present, comprises up to about 5 weight % of said second component; and
a biocide comprises up to about 0.2 weight % of said second component.

15. The multi-component system of claim 14, wherein said second component comprises:
about 22 weight % of said humectant;
about 2.5 weight % of said thickener;
about 2 weight % of said sugar solution;
about 3 weight % of said alcohol;
about 0.2 weight % of said surfactant;
about 0.1 weight % of said pH adjuster; and
about 0.1 weight % of said biocide.

16. The multi-component system of claim 2, wherein said third component comprises:
a humectant; and
a thickener.

17. The multi-component system of claim 16, wherein in said third component:
said humectant comprises about 1 weight % to about 20 weight % of said third component;
said thickener comprises up to about 25 weight % of said third component;
a surfactant is present and comprises up to about 1 weight % of said third component;
a pH adjuster is present and comprises up to about 1 weight % of said third component;
a biocide is present and comprises up to about 0.05 weight % of said third component.

18. The multi-component system of claim 17, wherein said third component comprises:
about 9 weight % of said humectant;
about 0.75 weight % of said thickener;
about 0.25 weight % of said surfactant;
about 0.27 weight % of said pH adjuster; and
about 0.05 weight % of said biocide.

19. The multi-component system of claim 1, wherein said second component comprises a non-woven material configured for application to a floor of a spray booth.

* * * * *